United States Patent [19]

Hancock et al.

[11] 4,333,393
[45] Jun. 8, 1982

[54] PITCHING MECHANISM FOR LAUTER TUN KNIVES

[75] Inventors: John C. Hancock, Willington; John M. Winwood, Mickelover; Noel R. Wilkinson, Burton on Trent, all of England

[73] Assignee: Robert Morton D.G. Limited, Burton-on-Trent, England

[21] Appl. No.: 127,139

[22] Filed: Mar. 4, 1980

[30] Foreign Application Priority Data

Jul. 17, 1979 [GB] United Kingdom ............... 7924815

[51] Int. Cl.³ .................... C12G 3/02; B01F 15/02
[52] U.S. Cl. ................................ 99/277.2; 366/196
[58] Field of Search .............. 366/311, 312, 313, 309, 366/129, 343, 342, 97, 98, 69, 96, 70, 184, 196; 99/277.2, 277.1

[56] References Cited

U.S. PATENT DOCUMENTS

| 223,753 | 1/1880 | Packer | 366/343 |
| 474,989 | 5/1892 | Hammill | 366/343 |
| 776,085 | 11/1904 | Marcy | 366/343 |

Primary Examiner—Robert W. Jenkins
Attorney, Agent, or Firm—Fidelman, Wolffe & Waldron

[57] ABSTRACT

A lauter tun knife assembly in which the knife is mounted for pivotal movement on a lauter knife drive, the pivotal mounting being about an axis adjacent a longitudinal edge of the knife, the pivotal movement being limited to a predetermined angle, preferably about 45°, so that on reversal of drive direction the knife flips through the predetermined angle.

3 Claims, 8 Drawing Figures

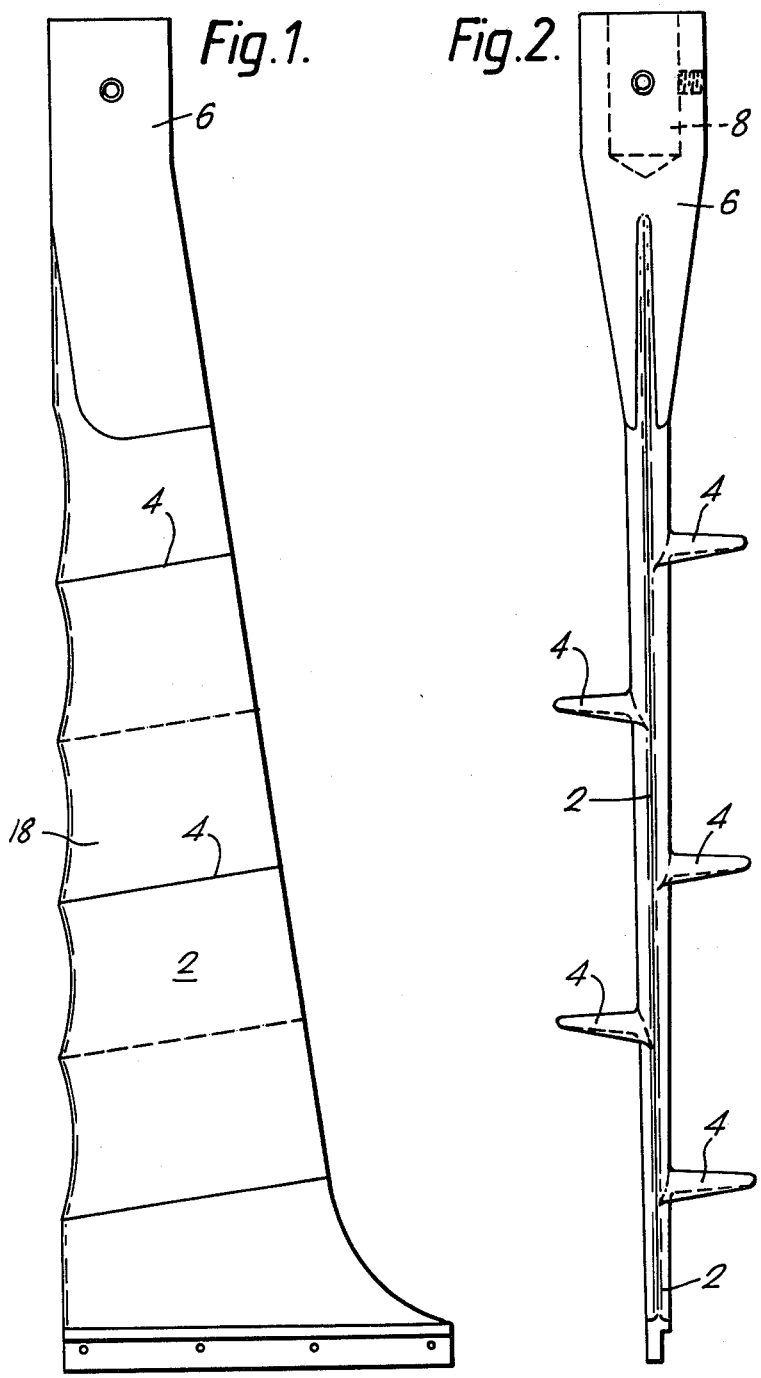

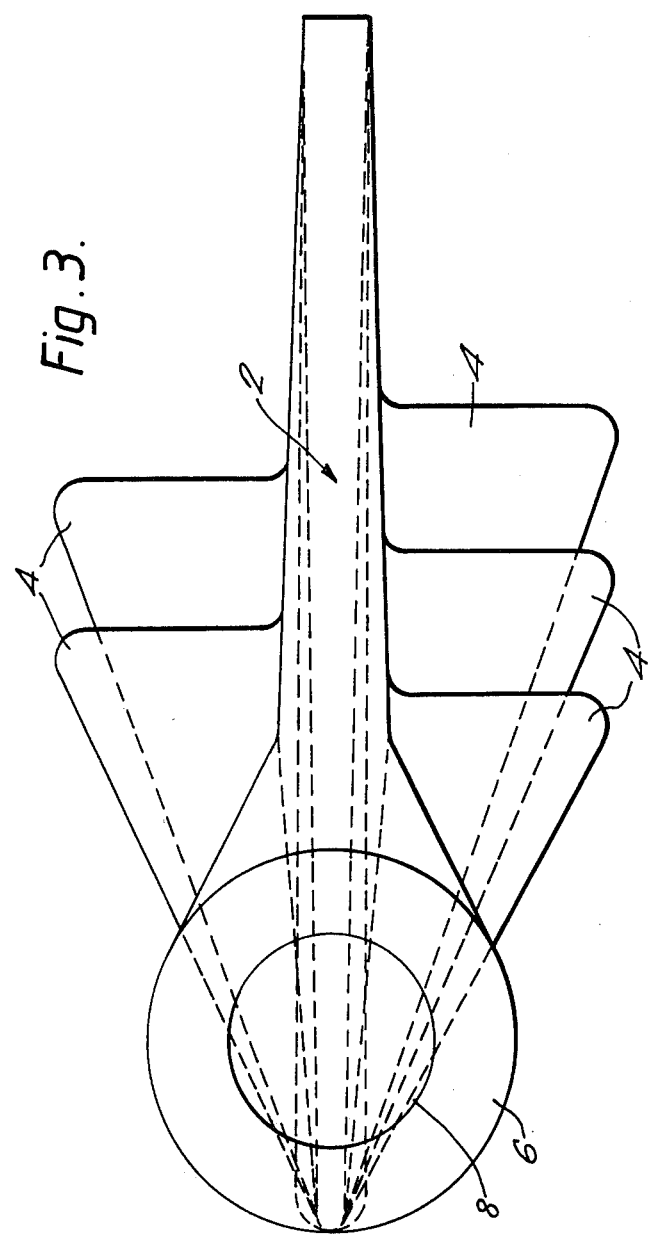

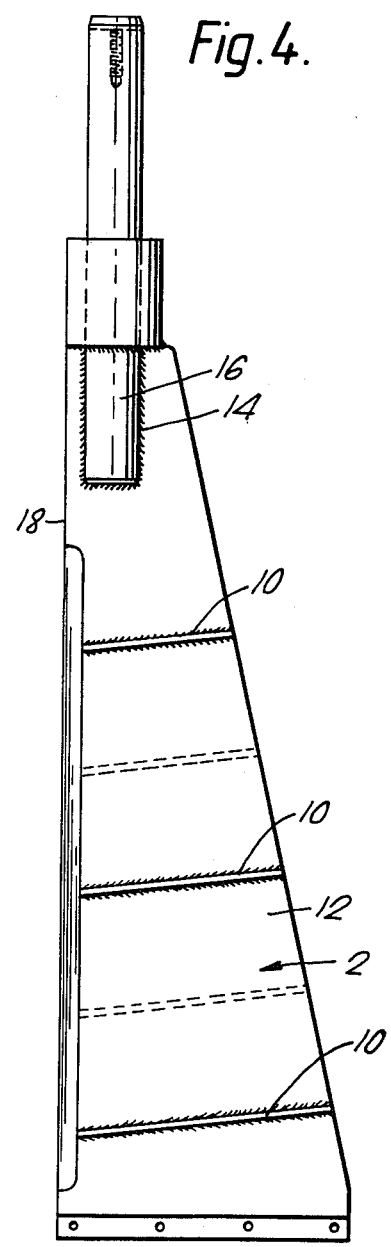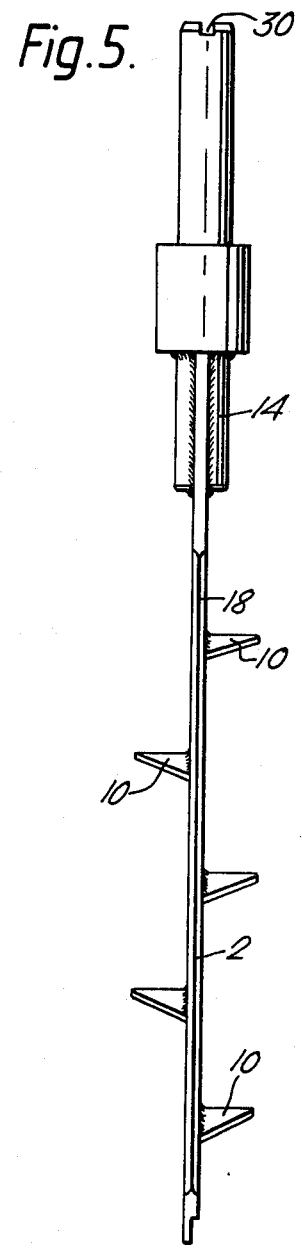

PITCHING MECHANISM FOR LAUTER TUN KNIVES

This invention relates to lauter tuns and more specifically to lauter knives which are positioned vertically within the tuns and which are rotated to work the contents of the tun during processing.

It is convenient for the knives also to be used to impel the contents of the tun through a discharge outlet once processing has been completed. To enable this to take place, it is necessary for the pitch of the knife blades to be changed.

Originally, the change of pitch of the blades was achieved by an operator leaning into the tun through a man access point or door or the like and operating a mechanism inside the tun. However, this was unhealthy and dangerous and this practice has now ceased.

At present, the change of pitch is achieved by a power operated mechanism and a number of quite complex mechanisms have been devised for achieving the pitch change using a drive from outside the tun, it being a problem to locate the drive inside the tun, firstly, because the tun is regarded as a food vessel and secondly, because the environment is hostile.

For example, a hydraulic cylinder inside the turn has been proposed but that has the disadvantage that the hydraulic pipework could leak oil into the contents of the tun and even if the fluid was distilled water for example, problems still arise as they also do with pneumatic cylinders on the basis that the operating air should be sterile in case there was a leak.

A lauter knife assembly in accordance with the invention is arranged so that the knife is pivotally mounted to drive means adjacent one longitudinal edge of the knife in such a way as to allow a predetermined angular displacement of, for example 45°, whenever the direction of rotation of the knife drive is reversed.

In this way, the knife may be pivoted at, for example, its leading edge and rotated in a "forward" direction for processing and then, for discharge, the direction of rotation of the drive is reversed, the knife pivot in effect trailing and the pressure of the worked material in the tun then causes each knife to flip and move through the required angle of pitch change (normally 45°) so that the material in the tun is discharged.

This provides a very neat and effective means of altering the pitch.

The pivotal mounting of the knife to the drive shaft may be achieved in a variety of ways. For example, a shaft may extend from the edge of the blade within a tubular housing in which it can rotate through a limited angular displacement determined by the extent of the permitted movement of a pin or the like extending transversely out from the shaft, into a slot in the housing.

The invention will now be further described by way of example with reference to the accompanying drawings in which:

FIG. 1 is a side elevation of one example of a lauter knife;

FIG. 2 is an elevation in the direction of the arrow X of FIG. 1;

FIG. 3 is a plan view corresponding to FIG. 7;

FIG. 4 is a side elevation of an alternative form of lauter knife;

FIG. 5 is an end elevation corresponding to FIG. 4;

The lauter knife 2 illustrated in FIGS. 1 to 3 is basically of standard construction being approximately triangular in side elevation (other shapes might of course be employed) and being provided with a number of triangular blades 4 extending out from each side alternatively of the knife body at a slight angle to the longitudinal axis of the knife.

As can be seen in FIG. 3, the head 6 of the knife is formed with a socket 8.

Figure 6:
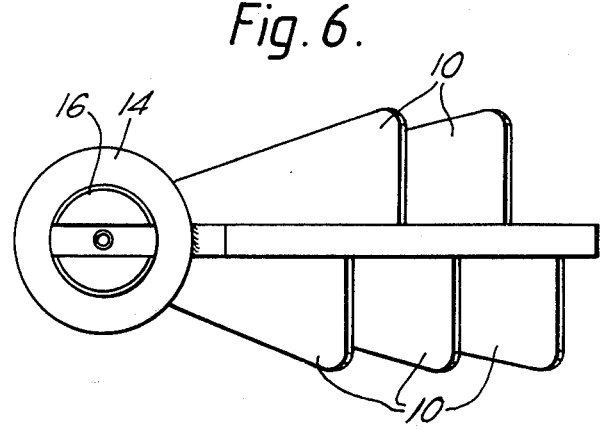
FIG. 6 is a plan view of FIG. 4.

The lauter knife illustrated in FIGS. 4 to 6 is basically similar to that of FIGS. 1 to 3 but is assembled rather than being cast, the blades 10 welded to the body 12 of the knife.

The head 14 of the knife is provided with a socket 16.

The sockets 8 and 16 are offset from the centreline of the knife and are positioned adjacent one longitudinal edge 18.

Figure 7:
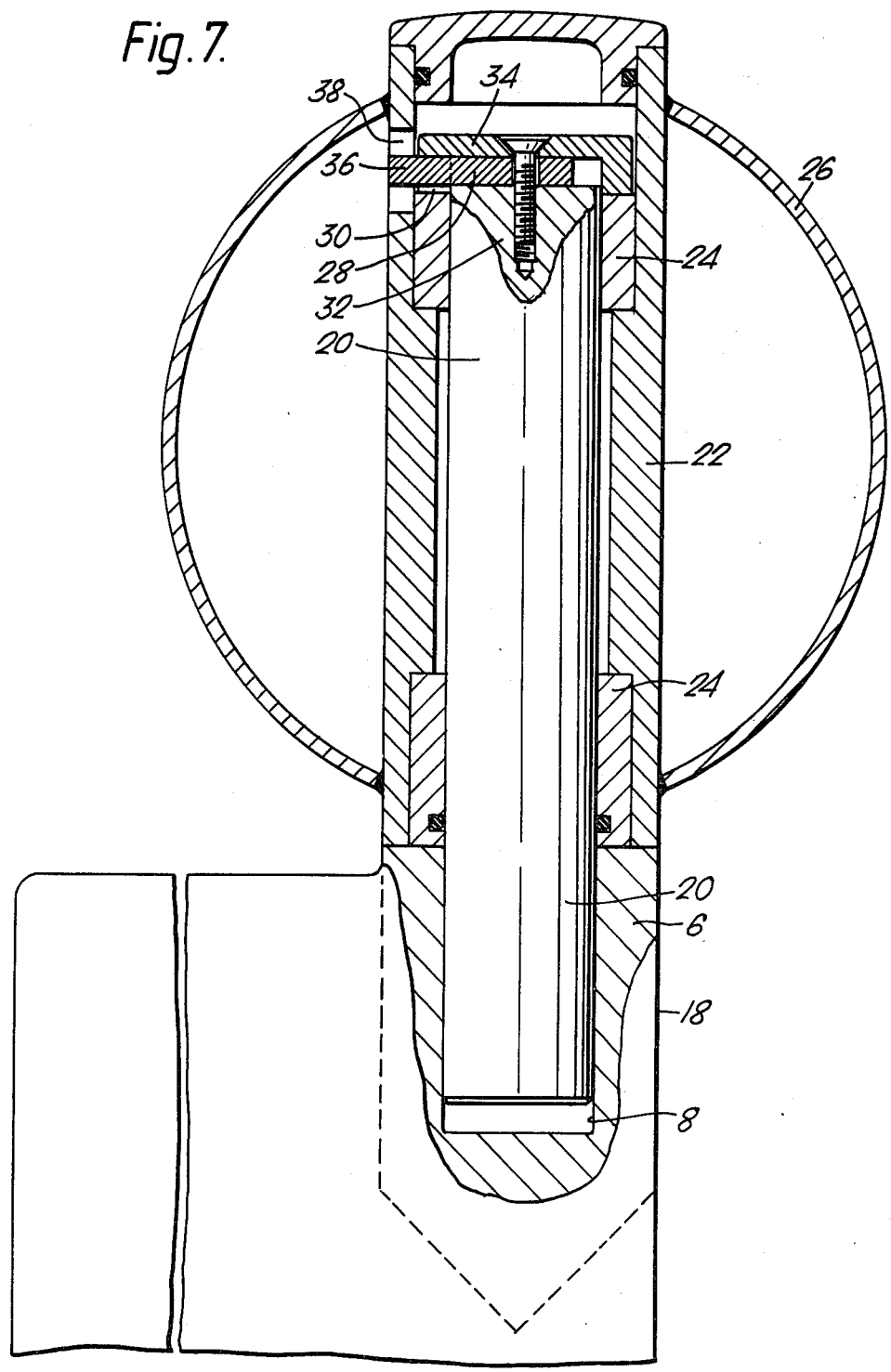
FIG. 7 is a section through the top of the cast knife illustrated in FIGS. 1 to 3 showing the pivotal mounting of the blade to the drive shaft/carriage arm, and, FIG. 8 is a section through the top portion of the housing tube.

Referring to FIG. 7, a shaft 20 extends into the socket 8 of the knife illustrated in FIGS. 1 to 3 and then upwardly through a housing tube 22, it being supported at each end of the tube by means of dry bearings 24, to permit rotation of the shaft within the tube.

The tube 22 is welded to a drive tube 26.

A key 28 extends transversely across the top of the shaft 20 within a slot 30 (see also FIG. 5) and is secured to the top of the shaft by means of a set screw 32 which also acts to hold a brass retaining cap 34 on to the top of the shaft.

Figure 8:
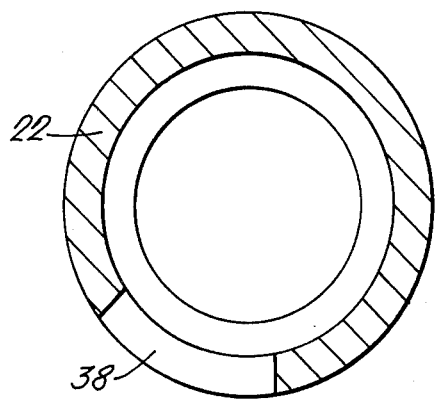

One end of the pin 28 extends out from the shaft into a slot 38 in the top of the housing tube 22. As can be seen from FIG. 8, the slot 38 extends through 45° so as to allow the shaft 20 and hence the lauter knife to rotate through 45° relative to the housing tube 22 and drive means 26.

When the drive tube 26 is rotated in one direction so that the edge 18 of the blade is leading, the knife and blades act to work the material within the lauter tun. However, when the direction of rotation of the drive means is reversed so that the edge 18 becomes the trailing edge, the reaction of the blades with the spent material in the tun causes the knife to move through 45° relative to the housing and drive tubes, the degree of movement being limited by the movement of the pin 36 in the slot 38.

The blades are now in a position to discharge the worked material from the tun.

We claim:

1. In an apparatus for working the contents of a lauter tun, said apparatus comprising at least one lauter tun knife, drive means for supporting said knife within and moving said knife through the contents of said tun, said knife comprising a longitudinal support axis, first and second edges, at least one blade pitched relative to said axis, and said first edge leading said second edge through said contents, the improvements comprising:

means for changing direction of moving of said knife between forward and reverse such that said second edge leads said first edge through said contents;

means for pivotally mounting said knife to said drive means for angular displacement of said knife about said axis by pressure exerted on said blade by said contents during said moving; and means for limiting the extent of said angular displacement between a first position and a second position such that said knife is pivotal between said first and second positions automatically according to which of said first and second edges is leading during said moving.

2. The improvement as in claim 1, wherein said angular displacement between said first and second positions is about 45°.

3. The improvement as in claim 1, and further comprising:

a shaft coaxial with said axis and extending from an end of said knife;

a tubular support mounted to said drive means, said tubular support having bearing means for receiving said shaft for said angular displacement; and wherein said limiting means comprises an arcuate slot in the periphery of said tubular support and a key means attached to said shaft and extending into said slot for engaging the extemities of said arcuate slot to determine said first and second positions.

* * * * *